United States Patent
Elliott et al.

(10) Patent No.: US 11,293,346 B2
(45) Date of Patent: Apr. 5, 2022

(54) AIR INTAKE SYSTEM

(71) Applicant: ROLLS-ROYCE plc, London (GB)

(72) Inventors: Michael I. Elliott, Sheffield (GB); Peter Banister, Derby (GB); Michael C. Willmot, Sheffield (GB); Silvia Fernandez Arranz, Derby (GB)

(73) Assignee: ROLLS-ROYCE PLC, London (GB)

( * ) Notice: Subject to any disclaimer, the term of this patent is extended or adjusted under 35 U.S.C. 154(b) by 108 days.

(21) Appl. No.: 16/391,626

(22) Filed: Apr. 23, 2019

(65) Prior Publication Data

US 2019/0360400 A1    Nov. 28, 2019

(30) Foreign Application Priority Data

May 22, 2018    (GB) ...................... 1808352

(51) Int. Cl.
| | |
|---|---|
| *F02C 7/057* | (2006.01) |
| *F01D 25/12* | (2006.01) |
| *F01D 25/14* | (2006.01) |
| *F02C 7/18* | (2006.01) |
| *F02C 7/04* | (2006.01) |
| *F02C 7/047* | (2006.01) |

(52) U.S. Cl.
CPC ............. *F02C 7/057* (2013.01); *F01D 25/12* (2013.01); *F01D 25/14* (2013.01); *F02C 7/04* (2013.01); *F02C 7/047* (2013.01); *F02C 7/18* (2013.01); *F05D 2220/32* (2013.01); *F05D 2260/20* (2013.01)

(58) Field of Classification Search
CPC .......... F02K 3/105; F02K 3/115; F01D 11/20; F01D 11/24; F01D 25/12; F01D 25/14; F02C 7/057; F02C 7/18; F02C 7/185
See application file for complete search history.

(56) References Cited

U.S. PATENT DOCUMENTS

| | | | | |
|---|---|---|---|---|
| 5,012,420 A | * | 4/1991 | Walker | F01D 11/24 415/1 |
| 5,269,135 A | * | 12/1993 | Vermejan | F02C 7/18 60/226.1 |
| 7,823,389 B2 | | 11/2010 | Seitzer et al. | |
| 9,045,998 B2 | | 6/2015 | Lo et al. | |
| 2008/0080967 A1 | * | 4/2008 | Urbassik | F01D 11/24 415/116 |
| 2010/0223905 A1 | * | 9/2010 | Todorovic | F02C 7/18 60/226.1 |

(Continued)

FOREIGN PATENT DOCUMENTS

| | | |
|---|---|---|
| EP | 0924407 | 6/1999 |
| EP | 3115588 | 1/2017 |

(Continued)

OTHER PUBLICATIONS

English translation of WO2018065304A1, provided by espacenet (Year: 2018).*

(Continued)

*Primary Examiner* — Thomas P Burke

(74) *Attorney, Agent, or Firm* — Crowell & Moring LLP

(57) ABSTRACT

There is provided an air intake system for providing air to a tip clearance control system. The air intake system comprises a ram-air intake having a scoop portion and a body portion. The body portion of the ram-air intake houses a heat exchanger.

12 Claims, 5 Drawing Sheets

(56) References Cited

U.S. PATENT DOCUMENTS

| | | | | |
|---|---|---|---|---|
| 2013/0145744 A1* | 6/2013 | Lo | ................ | F01D 17/105 |
| | | | | 60/226.3 |
| 2013/0156541 A1* | 6/2013 | Eleftheriou | ............ | F01D 11/20 |
| | | | | 415/1 |
| 2014/0144139 A1* | 5/2014 | Alecu | ................ | B21K 25/00 |
| | | | | 60/728 |
| 2015/0260101 A1* | 9/2015 | Teia Dos Santos Medes | | |
| | | Gomes | ................ | F02C 7/18 |
| | | | | 60/39.091 |
| 2015/0337675 A1* | 11/2015 | Suciu | ................ | F01D 17/00 |
| | | | | 60/805 |
| 2015/0345389 A1* | 12/2015 | Pisacreta | ................ | F02C 7/04 |
| | | | | 60/772 |
| 2015/0361891 A1* | 12/2015 | Schwarz | ................ | F02C 7/14 |
| | | | | 60/772 |
| 2016/0047269 A1* | 2/2016 | Zacchera | ................ | F01D 11/20 |
| | | | | 416/1 |
| 2019/0145315 A1* | 5/2019 | Dow | ................ | F01D 17/148 |
| | | | | 251/305 |
| 2019/0170009 A1* | 6/2019 | Sen | ................ | F01D 11/24 |

FOREIGN PATENT DOCUMENTS

| | | | |
|---|---|---|---|
| GB | 2274881 | 8/1994 | |
| WO | 2014143282 | 9/2014 | |
| WO | 2015105552 | 7/2015 | |
| WO | 2016131150 | 8/2016 | |
| WO | WO-2018065304 A1 * | 4/2018 | ............ F01D 25/12 |

OTHER PUBLICATIONS

Great Britain search report dated Sep. 18, 2019, issued in EP Patent Application No. 19169732.

Great Britain search report dated Nov. 20, 2018, issued in GB Patent Application No. 1808352.7.

* cited by examiner

AIR INTAKE SYSTEM

CROSS-REFERENCE TO RELATED APPLICATIONS

This specification is based upon and claims the benefit of priority from UK Patent Application Number 1808352.7 filed on 22 May 2018, the entire contents of which are incorporated herein by reference.

BACKGROUND

Technical Field

The present disclosure relates to an air intake system and in particular to an air intake system for a tip clearance control system e.g. a tip clearance control system for a turbine (e.g. a high pressure turbine or an intermediate/low pressure turbine) in a gas turbine engine.

Description of Related Art

Gas turbine engines typically include a thrust reverser unit at the rear of the engine configured to provide a thrust component having a reverse flow direction compared to normal in service flow in order to reduce the speed of an air craft carrying the gas turbine engine. A heat exchanger such as an oil/air matrix cooler may be mounted on the thrust reverser unit or on the engine core.

The rotating components such as the rotors in the compressors and turbines are designed such that rotor tip clearances are minimised so that the core air flow flowing through the clearance (and thereby not being utilised for performing work) is minimised. By minimising rotor tip clearance, engine thermodynamic efficiency is maximised.

However, a small gap must remain in order to prevent excessive tip rubs between the rotor blades and casing. Excessive tip rubs may result in the rotor blades becoming worn, which will in turn shorten the time between overhauls. There is therefore a conflict between the need to minimise the tip clearance for maximum thermodynamic efficiency, and the need to avoid tip rubs in order to extend service life.

Many gas turbine engines utilise Tip Clearance Control (TCC) systems in order to maintain the tip clearance at an optimum value. The TCC system includes a valve which is actuable to control cooling airflow to an exterior of the casing to control expansion and contraction of the casing to thereby control tip clearance.

The cooling air flow is typically provided from an air intake on the inner fairing of a bypass duct so that some of the bypass flow is directed along ducts to the casings. For example, in a gas turbine engine having a high pressure turbine and a low pressure turbine, there are two air intakes on the inner barrel of the bypass duct and two ducts extending between the respective air inlet and turbine casing.

The TCC systems are typically modulated using fueldraulic actuators/valves which are necessarily provided at the front of the gas turbine engine to avoid the high engine temperatures during service. This typically requires the TCC systems to draw their air from the front of the bypass duct which thus necessitates extensive ducting to guide the air to the casings of the turbines. This adds weight, complexity and cost to the gas turbine engine as well as taking up valuable space in the engine core. Furthermore, resonance and thus noise can result from the passage of the air in the extended ducts.

The present disclosure describes an air intake for a TCC system which seeks to overcome some or all of the above problems.

SUMMARY

According to a first aspect there is provided an air intake system for providing air to a tip clearance control system, the air intake system comprising a ram-air intake having a scoop portion and a body portion, wherein the body portion of the ram-air intake houses a heat exchanger.

By providing an air intake system which has a ram-air intake with a body portion housing a heat exchanger, the scoop portion of the ram-air intake can act as a single, combined air intake for both the tip clearance control (TCC) system and the heat exchanger. This eliminates the need for separate air off takes for the TCC and the heat exchanger thus freeing up valuable space in the engine core.

The term "ram-air intake" is intended to refer to an air intake which uses the dynamic air pressure to increase the static air pressure inside of the body portion. The scoop portion forces (or rams) air into the body portion.

In some embodiments, the TCC is for cooling a turbine casing in the gas turbine engine. In these embodiments, the air intake system further comprises at least one TCC duct for carrying air from the ram-air intake to the turbine casing. The at least one TCC duct may extend from a respective duct inlet within the body portion of the ram-air intake (e.g. in a side wall of the body portion) to the turbine casing.

The TCC may be for cooling a turbine casing of a high pressure turbine or a low/intermediate pressure turbine.

In some embodiments, the air intake system is for providing air to a tip clearance control system for a first turbine casing and a second turbine casing.

The first turbine casing may be a turbine casing of a high pressure turbine and the second turbine casing may be a turbine casing of a low/intermediate pressure turbine.

In these embodiments, the air intake system comprises a first TCC duct for carrying air from the ram-air intake to the first turbine casing and a second TCC duct for carrying air from the ram-air intake to the second turbine casing. Both TCC ducts may extend from their respective duct inlet within the body portion of the ram-air intake (e.g. in a side wall of the body portion) to the respective turbine casing.

In some embodiments, the scoop portion of the ram-air intake comprises a single intake channel and the body portion is divided into a central channel extending through the heat exchanger and one or more TCC channels extending to duct inlet(s). In use, air flows into the intake channel and then splits in the body portion between the central channel and the TCC channel(s). The air flow through the central channel passes though the body portion to an air outlet. The air flow through the TCC channel(s) enters the duct inlet(s) and passes along the TCC duct(s) to the turbine casing(s).

All of the intake channel, central channel and TCC channel(s) may be substantially axial.

Where there is a plurality of channels in the body portion of the ram-air intake, the scoop portion of the ram-air intake may be divided to direct air into each of the channels in the body portion i.e. there may be a plurality of intake channels in the scoop portion, each intake channel aligned with one of the channels in the body portion of the ram-air intake.

In other embodiments, the scoop portion of the ram-air intake comprises a single intake channel and the body portion comprises an upstream chamber into which air flows via the intake channel. The duct inlet(s) are provided in this upstream chamber and air flows from this upstream chamber of the body portion into the duct(s) and into a central downstream channel extending through the heat exchanger. The air flow through the central downstream channel passes though the body portion to an air outlet. The air flow through the TCC channel(s) enters the duct inlet(s) and passes along the TCC duct(s) to the turbine casing(s).

In some embodiments, the heat exchanger is a matrix cooler e.g. an oil/air or air/fuel or air/air or air/refrigerant matrix cooler.

In some embodiments, the air intake system includes at least one actuator/valve e.g. a pneumatic actuator/valve for controlling the flow of air along the TCC duct(s) to the turbine casing(s). For example, the or each TCC may each include a/a respective actuator/valve for controlling flow of air through the duct(s). The actuators/valves may be 2-stop or fully modulated actuators/valves.

In a second aspect, there is provided a tip clearance control system comprising an air intake system according to the first aspect.

The TCC system may comprise a manifold for encircling the first turbine and optionally a further manifold for encircling the second turbine, each manifold be provided with air from the air intake system.

In a third aspect, there is provided a gas turbine engine comprising a tip clearance control system according to the second aspect.

The gas turbine engine may comprise a thrust reverser and the air intake system may be mounted on the thrust reverser. Alternatively, it may be mounted on an inner fairing of the bypass duct or the engine core.

A turbine in a gas turbine engine is typically provided closer to the rear end of the engine (where the engine thrust reverser is located with the fan being at the upstream end) and the duct for carrying air from the ram-air intake to the turbine casing will be significantly shorter than the length of ducting required to carry air in known systems where air intake is at the front end of the engine. This reduces weight, complexity and cost of the gas turbine engine as well as reducing the ducting (and thus increasing space) within the engine core.

Accordingly, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.) with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Figure 4:
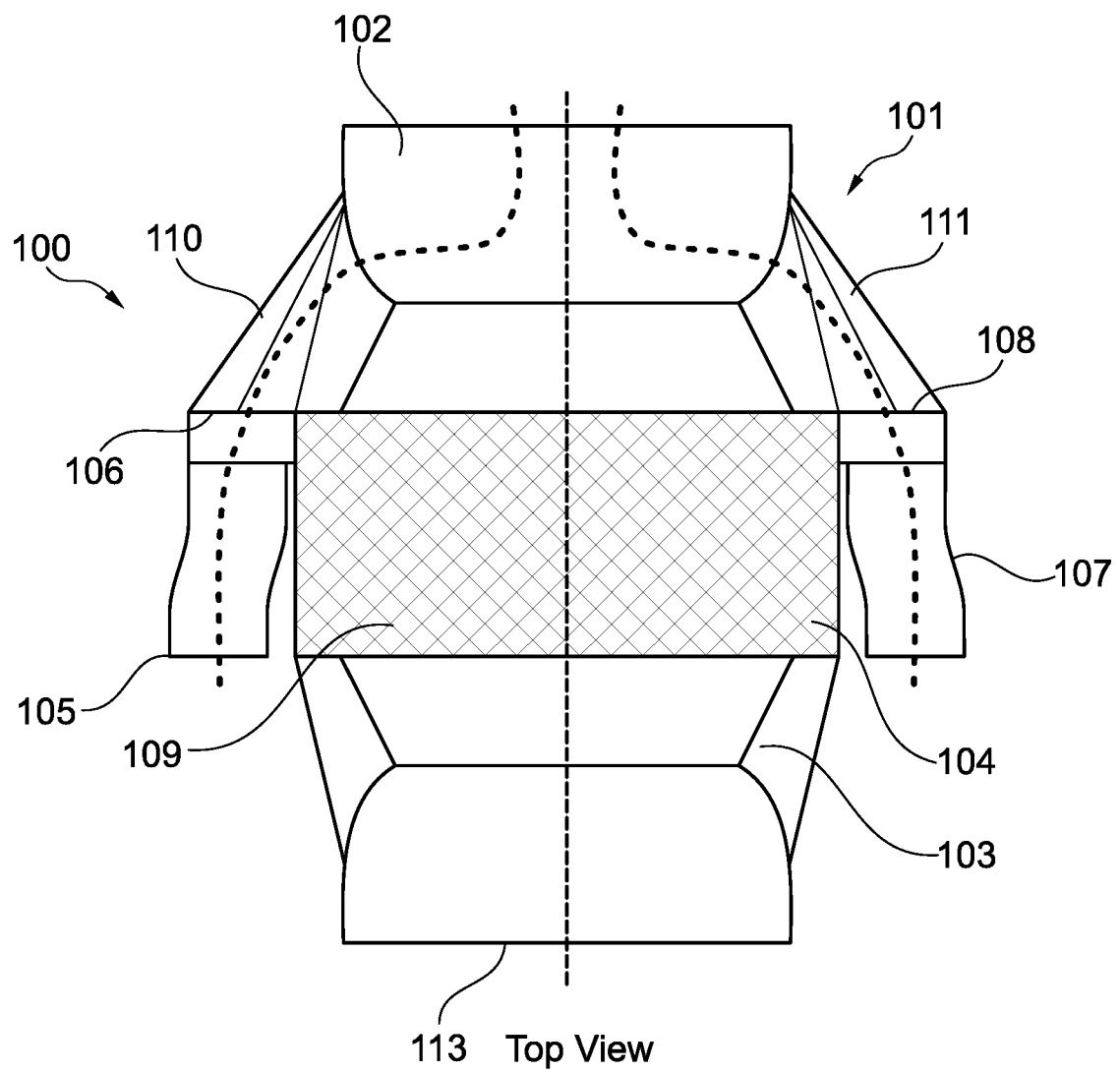
FIG. 4 is a top sectional view of a first embodiment.

FIG. 4 shows an air intake system 100 for providing air to a tip clearance control system of a first (high pressure) turbine casing and a second (low pressure) turbine casing.

The air intake system 100 comprises a ram-air intake 101 having a scoop portion 102 and a body portion 103. The body portion 103 of the ram-air intake 101 houses an oil/air matrix heat exchanger 104.

The air intake system 100 further comprises a first TCC duct 105 for carrying air from the ram-air intake 101 to the first turbine casing 114. The first TCC duct 105 extends from a first duct inlet 106 within the body portion 103 of the ram-air intake 101 to the first turbine casing 114. The air intake system 100 comprises a second TCC duct 107 for carrying air from the ram-air intake 101 to the second turbine casing 115. The second TCC duct 107 extends from a second duct inlet 108 within the body portion 103 of the ram-air intake 101 to the second turbine casing 115.

The scoop portion 103 of the ram-air intake 101 comprises a single intake channel and the body portion 103 is divided by partition walls into a central channel 109 extending through the heat exchanger and two TCC channels 110, 111 extending to duct inlets 106, 108. In use, air flows into the intake channel in the scoop portion 102 and then splits in the body portion 103 between the central channel 109 and the TCC channels 110, 111. The air flow through the central channel 109 passes through the body portion 103 to an air outlet 113. The air flow through the TCC channels 110, 111 enters the duct inlets 106, 108 and passes along the TCC ducts 105, 107 to the turbine casings.

By providing an air intake system 100 which has a ram-air intake 101 with a body portion 103 housing a heat exchanger 104, the scoop portion 102 of the ram-air intake 101 can act as a single, combined air intake for both the TCC system and the heat exchanger 104. This eliminates the need for separate air off takes for the TCC and the heat exchanger 104 thus freeing up valuable space in the engine core 11.

Figure 5:
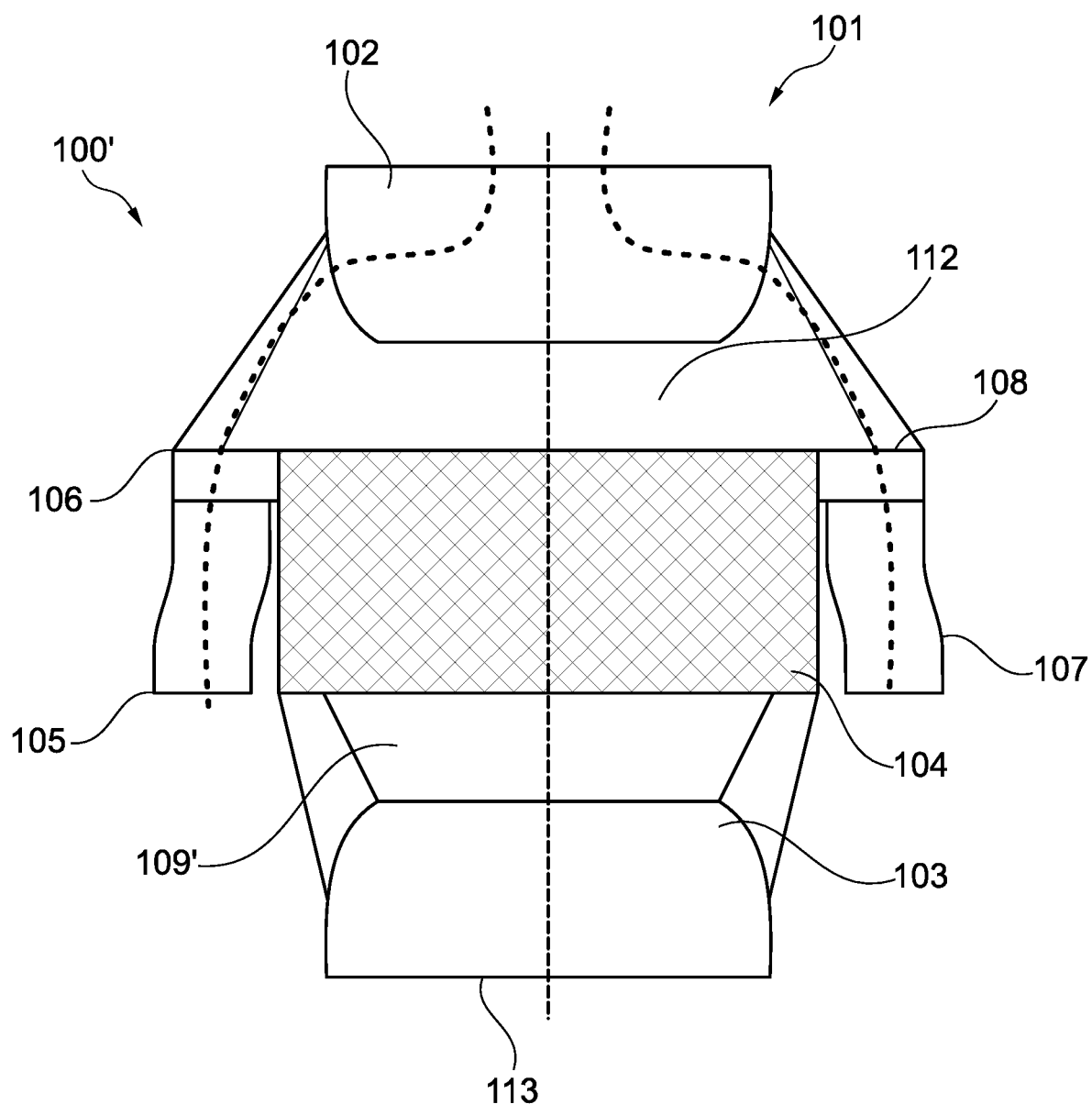
FIG. 5 is a top sectional view of a second embodiment.

In a second embodiment shown in FIG. 5, the scoop portion 102 of the ram-air intake 101 comprises a single intake channel and the body portion 103 comprises an upstream chamber 112 into which air flows via the intake channel. There are no partition walls in the upstream chamber. The duct inlets 106, 108 are provided in this upstream chamber 112 and air flows from this upstream chamber 112 of the body portion 103 into the TCC ducts 105, 107 and on to the turbine casings. A portion of the air flow also flows into a central downstream channel 109' extending through the heat exchanger 104. The air flow through the central downstream channel 109' passes though the body portion 103 to an air outlet 113.

A third embodiment of an air intake system 100" is similar to the first embodiment except the scoop portion 102 of the ram-air intake 101 is divided to direct air into each of the channels 109, 110, 111 in the body portion 103 i.e. there are three intake channels (defined by dividing walls) in the scoop portion 102, each intake channel being aligned with one of the channels 109, 110, 111 in the body portion 103 of the ram-air intake 101.

The TCC ducts 105, 107 may each be connected to a respective manifold for encircling the first turbine and the second turbine. The air intake system may be mounted on the thrust reverser of the gas turbine engine or inner fairing of the bypass duct 22 or engine core 11.

Figure 6:
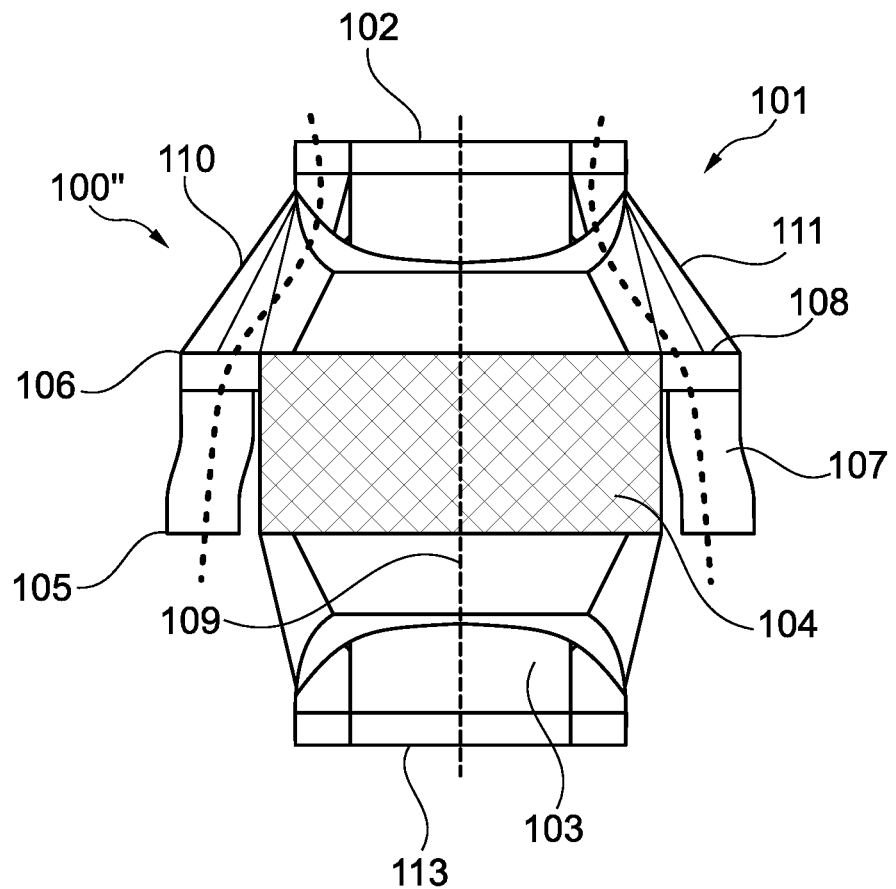
FIG. 6 is a top sectional view of a third embodiment.
Figure 7:
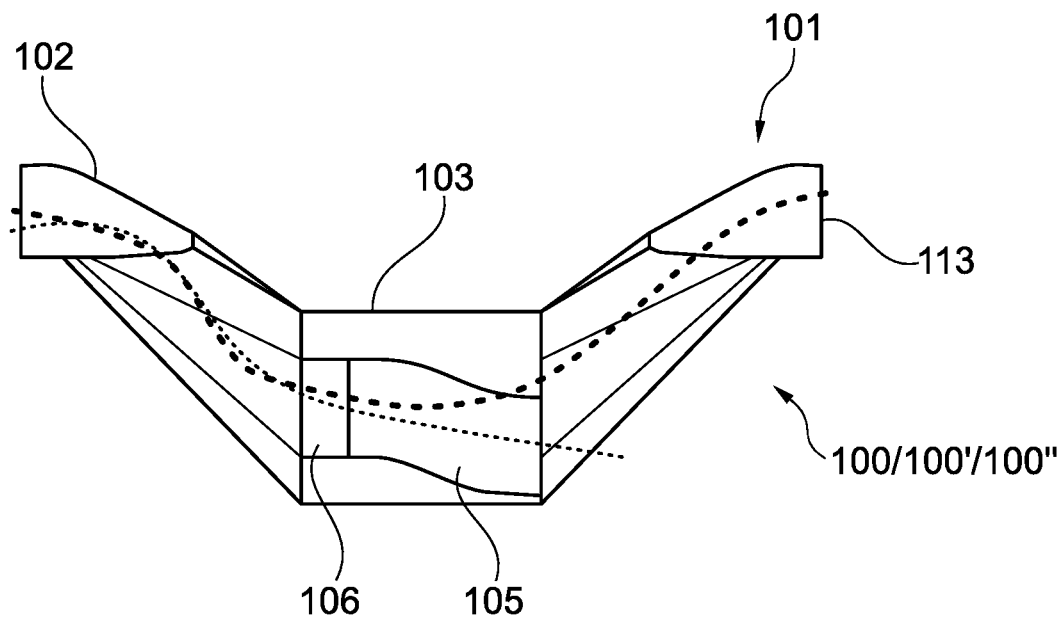
FIG. 7 is a side sectional view of the first to third embodiments.

FIG. 7 shows a side view of the ram-air intakes shown in FIG. 4-6. Air flow is channeled into the ramp scoop 101 via the scoop portion 102 and travels within the ram-air intake body 103 where it divides into three separate flows. Two air flows exit the body portion 103 via the TCC ducts 105, 107 (only one visible) and a central flow passes through a central channel 109/109' and out of an air outlet 113

Figure 1:
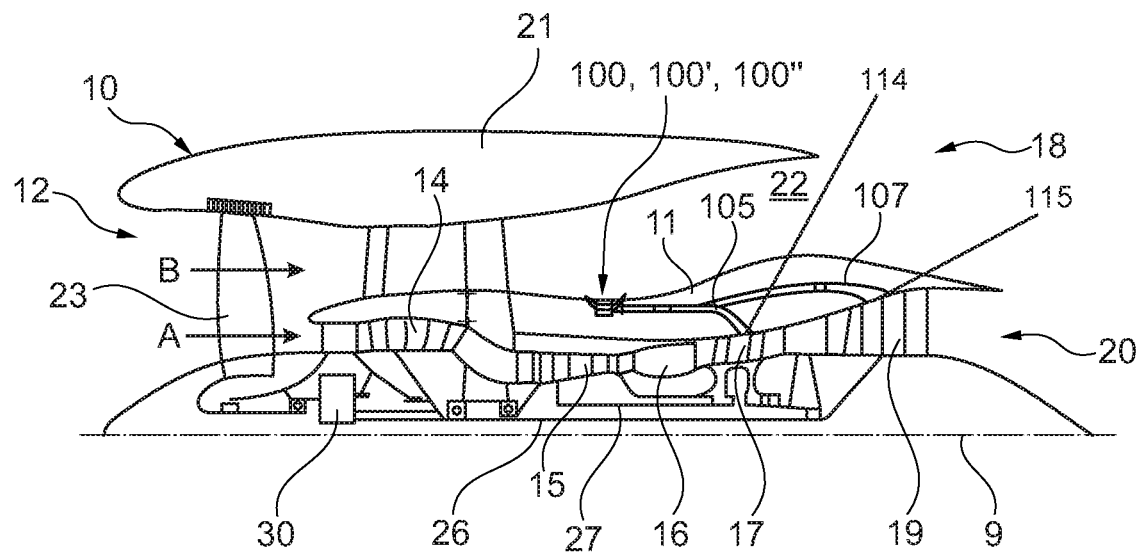
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

The air intake system 100, 100', 100" is mounted on the engine core 11 and the TCC ducts 105, 107 extend to the high and low pressure turbines 17, 19 respectively. In other embodiments, the air intake system 100, 100', 100" may be mounted on the thrust reverser (not shown) or an inner fairing of the bypass duct 22.

The clearance control systems described above are for use in a gas turbine engine such as that shown in FIG. 1 and discussed above.

Arrangements of the present disclosure may be particularly, although not exclusively, beneficial for fans 23 that are driven via a gearbox 30. Accordingly, the gas turbine engine may comprise a gearbox 30 that receives an input from the core shaft 26 and outputs drive to the fan 23 so as to drive the fan 23 at a lower rotational speed than the core shaft 26. The input to the gearbox 30 may be directly from the core shaft 26, or indirectly from the core shaft 26, for example via a spur shaft and/or gear.

Figure 2:
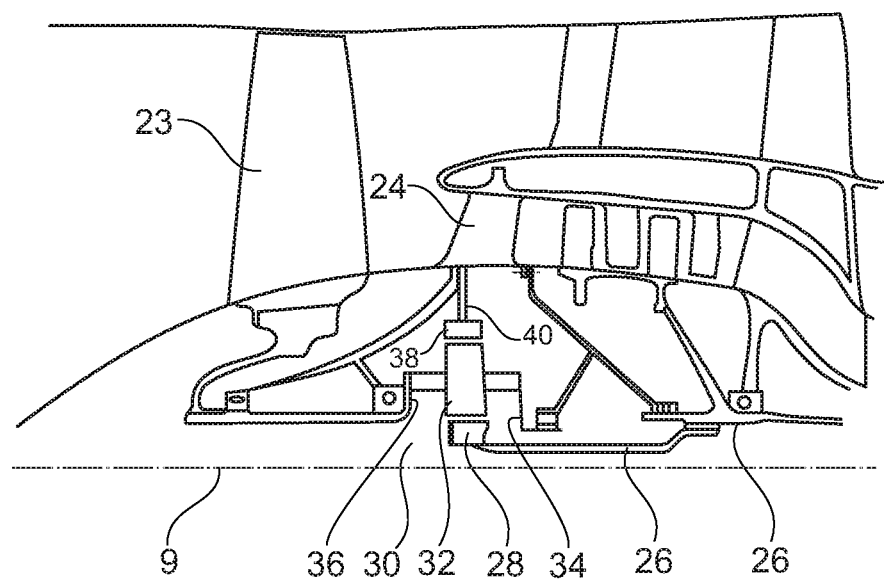
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
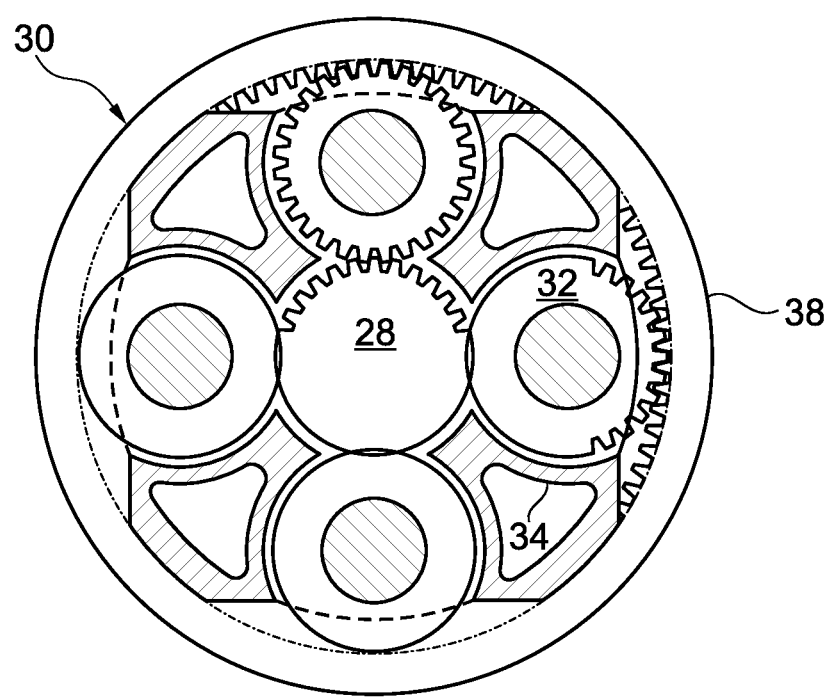
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. An air intake system for providing air to a tip clearance control system, the air intake system comprising:
a ram-air intake having a scoop portion and a body portion, wherein the body portion of the ram-air intake houses a heat exchanger, wherein the body portion is divided by partition walls into a central channel extending through the heat exchanger and a plurality of tip clearance control channels, each one of the plurality of tip clearance control channels extending to a respective duct inlet within the body portion, wherein the central channel extends longitudinally aft of a respective outlet of each tip clearance control channel and through the heat exchanger, the central channel extending away from the heat exchanger to an air outlet; and
at least one tip clearance control duct extending from each one of the respective duct inlets to a turbine casing, wherein air enters a single intake channel and splits in the body portion between the central channel and the plurality of tip clearance control channels, wherein the single intake channel splits between the central channel and the plurality of tip clearance control channels upstream of the heat exchanger.

2. The air intake system according to claim 1, wherein at least one tip clearance control duct comprises a first tip clearance control duct and a second tip clearance control duct, wherein the plurality of tip clearance control channels include a first tip clearance control channel and a second tip clearance control channel, and wherein the turbine casing is a first turbine casing, the first tip clearance control duct extending from a first duct inlet within the body portion of the ram-air intake to the first turbine casing and the second tip clearance control duct extending from a second duct inlet within the body portion of the ram-air intake to a second turbine casing.

3. The air intake system according to claim 1, wherein the scoop portion of the ram-air intake comprises a single intake channel.

4. The air intake system according to claim 1, wherein the scoop portion of the ram-air intake comprises a plurality of intake channels, each one of the plurality of intake channels aligned with one of the plurality of tip clearance control channels or the central channel in the body portion of the ram-air intake.

5. The air intake system according to claim 1, wherein the scoop portion of the ram-air intake comprises a single intake channel and the body portion comprises an upstream chamber in fluid communication with the single intake channel and with the duct inlet(s) and a central downstream channel in the body portion.

6. The air intake system according to claim 1, wherein the heat exchanger is an oil/air matrix cooler or an air/fuel matrix cooler or an air/air matrix cooler or an air/refrigerant matrix cooler.

7. A tip clearance control system comprising the air intake system according to claim 1.

8. The tip clearance control system according to claim 7, wherein the at least one tip clearance control duct includes a tip clearance control duct, the tip clearance control system comprising a manifold, the manifold being connected to the tip clearance control duct.

9. The tip clearance control system according to claim 8, wherein the at least one tip clearance control duct includes a further tip clearance control duct, the tip clearance control system further comprising a further manifold, the further manifold being connected to the further tip clearance control duct.

10. A gas turbine engine comprising the tip clearance control system according to claim 7.

11. An air intake system for providing air to a tip clearance control system, the air intake system comprising:
a ram-air intake having a scoop portion and a body portion, wherein the body portion of the ram-air intake houses a heat exchanger, wherein the body portion is divided by partition walls into a central channel extending through the heat exchanger and one or more tip clearance control channels, each one of the one or more tip clearance control channels extending to a respective duct inlet within the body portion, the central channel extending away from the heat exchanger to an air outlet; and at least one tip clearance control duct extending from the duct inlet to a turbine casing, wherein air enters a single intake channel and splits in the body portion between the central channel and the one or more tip clearance control channels, wherein the single intake channel splits between the central channel and the one or more tip clearance control channels upstream of the heat exchanger.

12. An air intake system for providing air to a tip clearance control system, the air intake system comprising:

a ram-air intake having a scoop portion and a body portion, wherein the body portion of the ram-air intake houses a heat exchanger, wherein the body portion is divided by partition walls into a central channel extending through the heat exchanger and one or more tip clearance control channels, each one of the one or more tip clearance control channels extending to a respective duct inlet within the body portion, the central channel extending away from the heat exchanger to an air outlet; and at least one tip clearance control duct extending from the duct inlet to a turbine casing, wherein an opening of the scoop portion is divided into a plurality of intake channels, wherein a first intake channel of the plurality of intake channels directs air into the central channel and at least one second intake channel of the plurality of intake channels directs air into the one or more tip clearance control channels, wherein the plurality of intake channels extend the full length of the scoop portion such that each inlet of the plurality of intake channels is located at the same axial location.

* * * * *